(12) United States Patent
Sasakura

(10) Patent No.: US 8,667,159 B2
(45) Date of Patent: Mar. 4, 2014

(54) COMMUNICATION DEVICE, COMMUNICATION METHOD, AND COMPUTER PRODUCT

(75) Inventor: Akihiro Sasakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 791 days.

(21) Appl. No.: 11/511,465

(22) Filed: Aug. 29, 2006

(65) Prior Publication Data

US 2006/0294185 A1 Dec. 28, 2006

Related U.S. Application Data

(63) Continuation of application No. PCT/JP2004/006565, filed on May 10, 2004.

(51) Int. Cl.
*G06F 15/16* (2006.01)
*G06F 15/173* (2006.01)

(52) U.S. Cl.
USPC .......................................... 709/231; 709/224

(58) Field of Classification Search
USPC .......................................................... 709/231
See application file for complete search history.

(56) References Cited

U.S. PATENT DOCUMENTS

| | | | |
|---|---|---|---|
| 6,333,932 B1 | 12/2001 | Kobayasi et al. | |
| 7,061,920 B2 * | 6/2006 | Janko et al. | 370/395.5 |
| 7,117,521 B2 * | 10/2006 | Puthiyedath | 725/107 |
| 7,551,612 B2 | 6/2009 | Kobayashi et al. | |
| 2001/0052019 A1 * | 12/2001 | Walters et al. | 709/231 |
| 2002/0087760 A1 * | 7/2002 | Clapp et al. | 710/62 |
| 2002/0150102 A1 * | 10/2002 | Janko et al. | 370/392 |
| 2003/0236906 A1 * | 12/2003 | Klemets et al. | 709/231 |
| 2004/0153561 A1 * | 8/2004 | Dalal et al. | 709/231 |
| 2005/0041117 A1 * | 2/2005 | Yamagishi | 348/231.2 |
| 2007/0019873 A1 * | 1/2007 | Tzannes et al. | 382/239 |

FOREIGN PATENT DOCUMENTS

| | | |
|---|---|---|
| JP | 59-15386 | 1/1984 |
| JP | 4-227196 | 8/1992 |
| JP | 5-260471 | 10/1993 |
| JP | 8-214002 | 8/1996 |
| JP | 10-75434 | 3/1998 |
| JP | 2000-287226 | 10/2000 |
| JP | 2001-189823 | 7/2001 |
| JP | 2001-298428 | 10/2001 |

OTHER PUBLICATIONS

"Echo Protocol" Postel, J. May 1983. Network Working Group, Request for Comments: 862.*
"Introduction to MSN Messenger functions" by Microsoft Corporation Ltd. (online), (searched Apr. 16, 2004), Internet (http://www.special-msn.com/messenger/communi.htm).
"What is Meet service (videophone) course" by Sony Corporation Ltd. (online), (searched Apr. 16, 2004), Internet (http://www.meet.gs/tv-phone/index.html).

(Continued)

*Primary Examiner* — Noel Beharry
(74) *Attorney, Agent, or Firm* — Staas & Halsey LLP

(57) ABSTRACT

A data transceiver of a user terminal receives image data and sound data that are transmitted from a destination by streaming. A video chat processor of the user terminal reproduces the received data, thereby providing a communication device, a communication method, and a communication program that enable a user to easily and efficiently confirm, based on returned data, a reproduction quality of the image data and the sound data that are transmitted by streaming.

3 Claims, 11 Drawing Sheets

(56) References Cited

OTHER PUBLICATIONS

"What is Eyeball patio" by Nifty Corporation Ltd. (online), (searched Apr. 16, 2004), Internet (http://www.nifty.com/eyeball/about.htm)).

Japanese Office Action mailed Jun. 30, 2009 and issued in corresponding Japanese Patent Application 2006-512902.
Decision of a Patent Grant mailed Mar. 9, 2010 in Application No. 2006-512902.

* cited by examiner

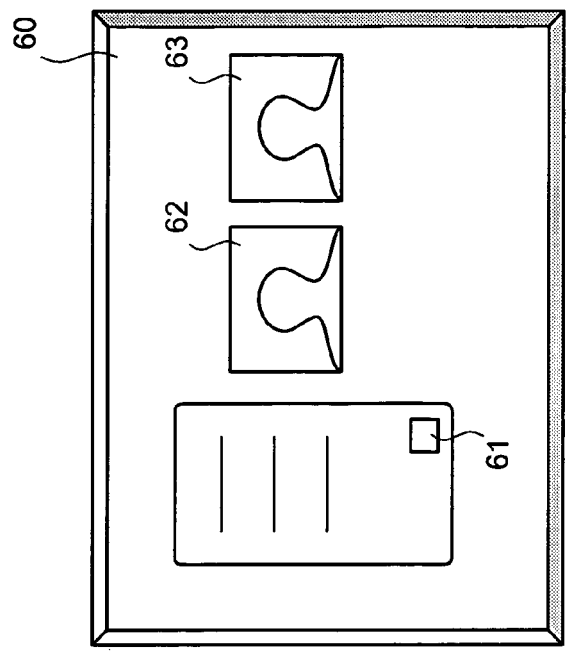
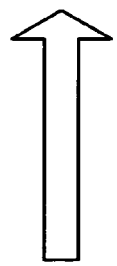
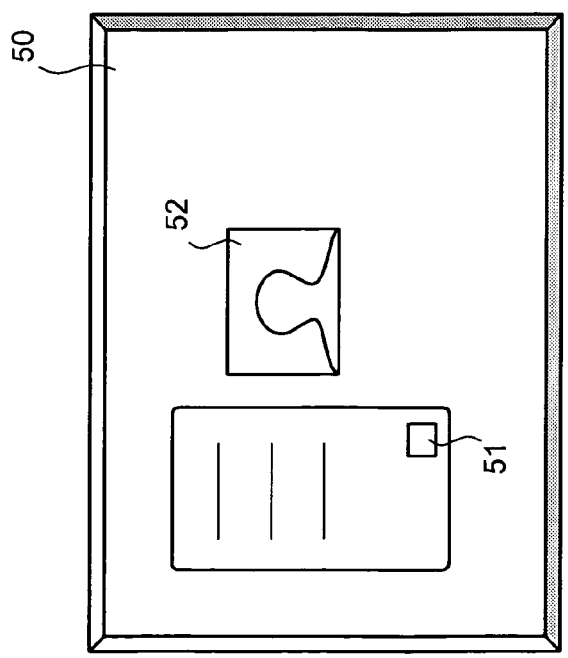
FIG.2

FIG.6
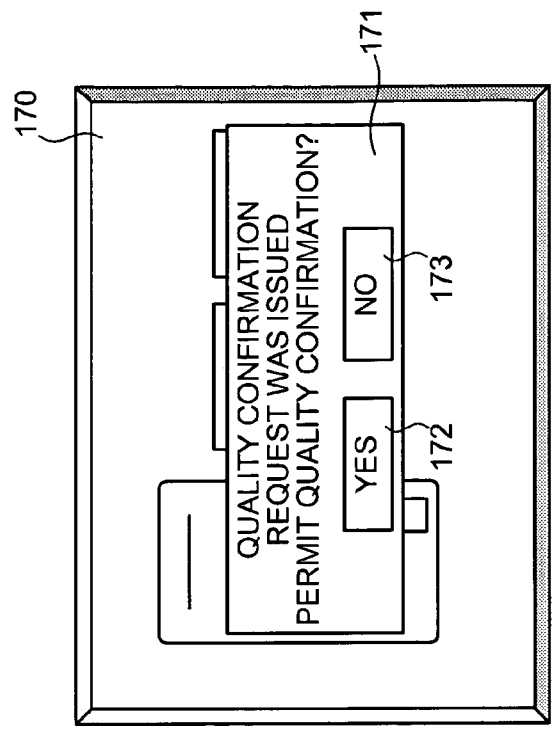
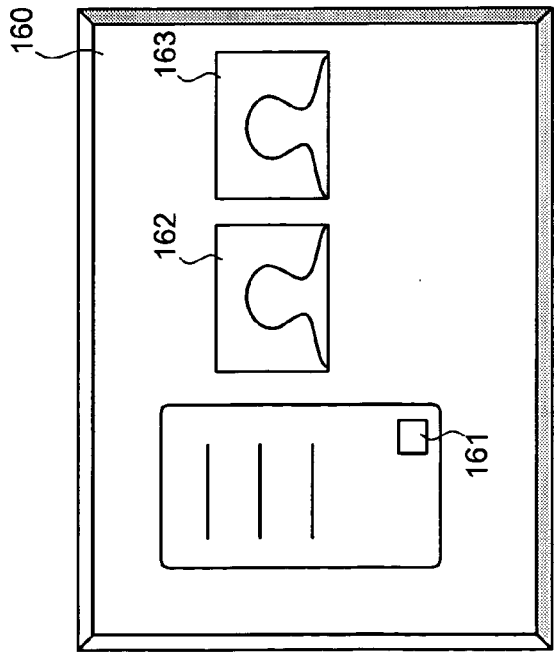

COMMUNICATION DEVICE, COMMUNICATION METHOD, AND COMPUTER PRODUCT

CROSS REFERENCE TO RELATED APPLICATIONS

This application is a continuing application, filed under 35 U.S.C. §111(a), of International Application PCT/JP2004/006565, filed May 10, 2004, herein incorporated by reference.

BACKGROUND OF THE INVENTION

1. Field of the Invention

The present invention generally relates performing data communication via a network by streaming, and, specifically relates to confirming reproduction quality of streaming data.

2. Description of the Related Art

Recently, due to spread of broadband communication in the Internet, a communication system called video chat or videophone is widely used that uses multimedia data such as sound data or image data to carry out conversation in real time.

In the communication system, a microphone and a camera that are connected to a user's computer fetch the sound data and the image data, and the fetched sound data and the image data are transmitted to the computer of a communication partner via the Internet by streaming. In streaming technology, the computer of a communication partner starts reproduction of the sound data and the image data before receiving the entire sound data and the image data.

The user's computer receives by streaming the sound data and the image data that are transmitted from the computer of the communication partner and reproduces the received data, thereby enabling to carry out conversation with the communication partner in real time (See "Introduction to MSN Messenger functions" by Microsoft Corporation Ltd. (online), (searched Apr. 16, 2004), Internet (http://www.special-msn.com/messenger/communi.htm), "What is Meet service (videophone) course" by Sony Corporation Ltd. (online), (searched Apr. 16, 2004), Internet (http://www.meet.gs/tv-phone/index.html), and "What is Eyeball patio" by Nifty Corporation Ltd. (online), (searched Apr. 16, 2004), Internet (http://www.nifty.com/eyeball/about.htm)).

However, in a conventional technology that is disclosed in "Introduction to MSN Messenger functions" by Microsoft Corporation Ltd. (online), (searched Apr. 16, 2004), Internet (http://www.special-msn.com/messenger/communi.htm), "What is Meet service (videophone) course" by Sony Corporation Ltd. (online), (searched Apr. 16, 2004), Internet (http://www.meet.gs/tv-phone/index.html), and "What is Eyeball patio" by Nifty Corporation Ltd. (online), (searched Apr. 16, 2004), Internet (http://www.nifty.com/eyeball/about.htm), the user who transmits the data cannot confirm a reproduction quality of the sound data and the image data that is transmitted to the computer of the communication partner.

In other words, because the sound data and the image data are transmitted via the Internet, a time lag and a distortion of the sound or the image can occur due to condition of a transmission path. However, the user who transmits the data cannot confirm an extent of the time lag and the distortion of the sound or the image.

Due to this, the user who transmits the data has to get information about the actual reproduction quality indirectly by inquiring the condition of the reproduction quality of the sound data and the image data to the communication partner.

Thus, there is a need for a technology with which the user who transmits the data can efficiently confirm the reproduction quality.

SUMMARY OF THE INVENTION

It is an object of the present invention to at least partially solve the problems in the conventional technology.

According to an aspect of the present invention, a computer-readable recording medium stores therein a computer program that causes a computer to execute transmitting data to a destination device by streaming and receiving the data that is transmitted from the destination device; and reproducing received data.

According to another aspect of the present invention, a computer-readable recording medium stores therein a computer program that causes a computer to execute receiving data that is transmitted by streaming from a source device; and returning to the source device the data that is received at the receiving.

According to still another aspect of the present invention, a communication device that carries out data communication via a network by streaming includes a receiving unit that transmits data to a destination device by streaming and receives the data that is transmitted from the destination device; and a reproducing unit that reproduces received data.

According to still another aspect of the present invention, a communication device that carries out data communication by streaming via a network includes a receiving unit that receives the data that is transmitted by streaming from a source device; and a returning unit that returns to the source device the data that is received by the receiving unit.

According to still another aspect of the present invention, a communication method of carrying out data communication by streaming via a network includes transmitting data from a source device to a destination device by streaming; returning the data from the destination device to the source device; and reproducing at the source device data received from the destination device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic of an example of reproduction screens of image data and sound data;

FIG. 6 is a schematic of an example of a video chat screen when a reproduction quality confirmation request is issued;

DETAILED DESCRIPTION OF THE PREFERRED EMBODIMENTS

Exemplary embodiments of the present invention are explained in detail below with reference to the accompanying drawings.

Execution of a reproduction quality confirming process of data that is transmitted by streaming using a server that is included in an Application Service Provider (ASP) is explained in a first embodiment of the present invention.

Figure 1:
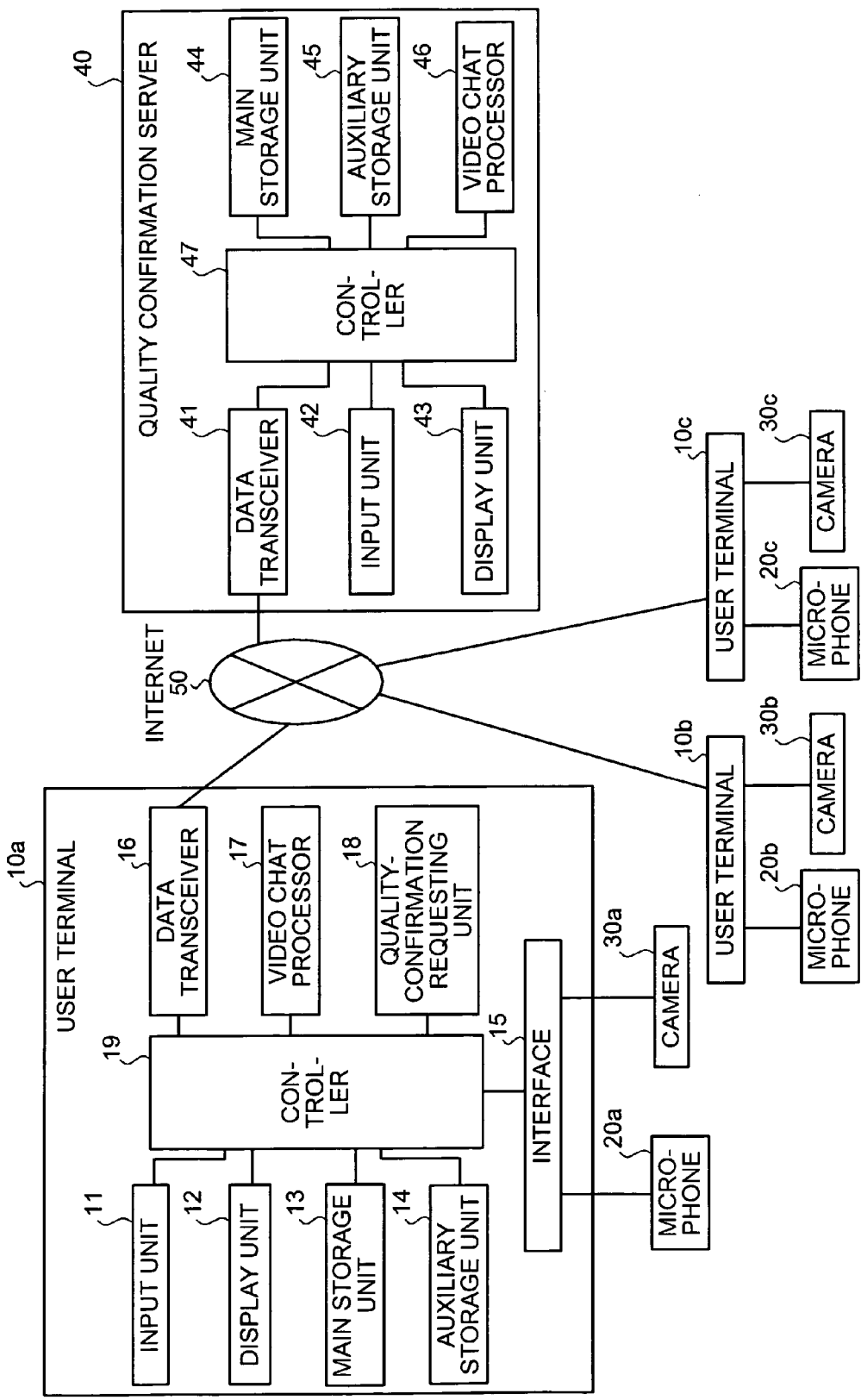
FIG. 1 is a functional block diagram of a streaming system according to a first embodiment of the present invention.

A functional structure of a streaming system according to the first embodiment is explained first. FIG. 1 is a functional block diagram of the streaming system according to the first embodiment.

As shown in FIG. 1, in the streaming system according to the first embodiment, microphones 20a through 20c that fetch sound data and cameras 30a to 30c that shoot image data are connected to user terminals 10a to 10c. Further, a quality confirmation server 40 that is included in the ASP and that is used to confirm a reproduction quality of the sound data and the image data is connected via Internet 50.

The user terminals 10a to 10c transceive data with the other user terminals 10a to 10c by streaming. A user carries out video chat in real time using the user terminals 10a to 10c.

Apart from transceiving data with the other user terminals 10a to 10c, the user terminals 10a to 10c receive by streaming an execute request of the reproduction quality confirming process from the user.

Upon receiving the execute request of the reproduction quality confirming process, the user terminals 10a to 10c transmit by streaming the sound data and the image data to the quality confirmation server 40 by splitting the sound data and the image data in packets that are data transmission units.

Upon receiving the packets that are transmitted by the user terminals 10a to 10c, the quality confirmation server 40 carries out a process to modify a destination of the packets to the user terminals 10a to 10c that are the source of the packets and to return the packets to the user terminals 10a to 10c.

Next, the user terminals 10a to 10c receive and reproduce the data that is returned by the quality confirmation server 40, thereby enabling the user to easily and efficiently confirm a reproduction quality of the data transmitted via the Internet 50 in real time.

Especially, in the reproduction quality confirming process, the user uses an Asymmetric Digital Subscriber Line (ADSL), and a communication speed in an upward direction of the user terminals 10a to 10c is slower compared to a communication speed in a downward direction. The reproduction quality confirming process according to the first embodiment is appropriate for verifying the reproduction quality if such a difference in communication speed is significantly hampering enhancement of the reproduction quality. A sufficiently greater communication speed of the quality confirmation server 40 in both the upward direction and the downward direction is desirable for the reproduction quality confirming process.

The user terminal 10a includes an input unit 11, a display unit 12, a main storage unit 13, an auxiliary storage unit 14, an interface 15, a data transceiver 16, a video chat processor 17, a quality-confirmation requesting unit 18, and a controller 19. Because a structure of the user terminal 10b and the user terminal 10c is similar to the structure of the user terminal 10a, a detailed explanation is omitted.

The input unit 11 is an input device such as a mouse or a keyboard. The display unit 12 is a display device such as a display. The main storage unit 13 is a main memory device such as a Random Access Memory (RAM), and carries out a process to temporarily store various types of data.

For example, the main storage unit 13 temporarily stores the sound data fetched by the microphone 20a, the image data shot by the camera 30a, the sound data and the image data received from the quality confirmation server 40 by streaming etc.

The auxiliary storage unit 14 is an auxiliary memory device such as a Hard Disk and stores various types of data related to the operating system, application software etc.

The interface 15 carries out a transfer of control data between the user terminal 10a and the microphone 20a or the camera 30a, and fetches the sound data, the image data etc. The data transceiver 16 carries out transceiving of data with the other user terminals 10b or 10c and with the quality confirmation server 40.

The video chat processor 17 carries out a process to reproduce by streaming the sound data and the image data that are fetched by the microphone 20a and the camera 30a respectively, or carries out a process to reproduce by streaming the sound data and the image data received from the other user terminals 10b and 10c or the quality confirmation server 40.

The quality-confirmation requesting unit 18 receives an input of a start request and an end request of the reproduction quality confirming process from the user, and transmits the start request and the end request of the reproduction quality confirming process to the quality confirmation server 40. The controller 19 controls the entire user terminal 10a and controls transfer of data between various functioning units.

Upon receiving the execute request of the reproduction quality confirming process from the user terminals 10a to 10c, the quality confirmation server 40 carries out a process to receive the packets of the sound data and the image data that are transmitted from the user terminals 10a to 10c by streaming, modify the destination of the received packets to the source, and return the packets.

The quality confirmation server 40 includes a data transceiver 41, an input unit 42, a display unit 43, a main storage unit 44, an auxiliary storage unit 45, a video chat processor 46, and a controller 47.

The data transceiver 41 carries out transceiving of data between the quality confirmation server 40 and the user terminals 10a to 10c. The input unit 42 is an input device such as a mouse or a keyboard. The display unit 43 is a display device such as a display.

The main storage unit 44 is a main memory device such as a RAM and carries out a process to temporarily store various types of data. For example, the main storage unit 44 temporarily stores the image data and the sound data received from the user terminals 10a to 10c.

The auxiliary storage unit 45 is an auxiliary memory device such as a Hard Disk, and stores various types of data related to the operating system, application software etc.

Upon receiving the packets of the image data and the sound data from the user terminals 10a to 10c, the video chat processor 46 carries out the process to modify the destinations of the received packets to the user terminals 10a to 10c that have transmitted the packets and to return the packets. The controller 47 controls the entire quality confirmation server 40 and controls transfer of data between various functioning units.

FIG. 2 is a schematic of an example of reproduction screens for the image data and the sound data. As shown in FIG. 2, an image 52 shot by the camera 30a is displayed in a reproduction screen 59. Further, a confirmation button 51 which is displayed in the reproduction screen 59 requests start of the reproduction quality confirming process of the image data and the sound data that is transmitted by streaming.

Upon clicking the confirmation button 51 using the mouse etc., control data is transmitted to the quality confirmation server 40. The control data requests the quality confirmation server 40 to return the packets of the image data and the sound data that are transmitted by streaming.

Upon returning of the packets of the image data and the sound data that are transmitted to the quality confirmation server 40, a reproduction process of the returned packets of the image data and the sound data is carried out by streaming.

In the reproduction process, as shown in FIG. 2, an image 62 that is shot by the camera 30a and an image 63 that is returned by the quality confirmation server 40 are displayed adjacent to each other in a reproduction screen 60. The sound data that is returned by the quality confirmation server 40 is also reproduced together.

The user compares the image 62 and the image 63 that are adjacently displayed, thereby enabling to easily confirm a distortion of the sound or the image, a time lag during reproduction etc. The reproduction quality confirming process ends when the user reclicks the confirmation button 61.

Figure 3:
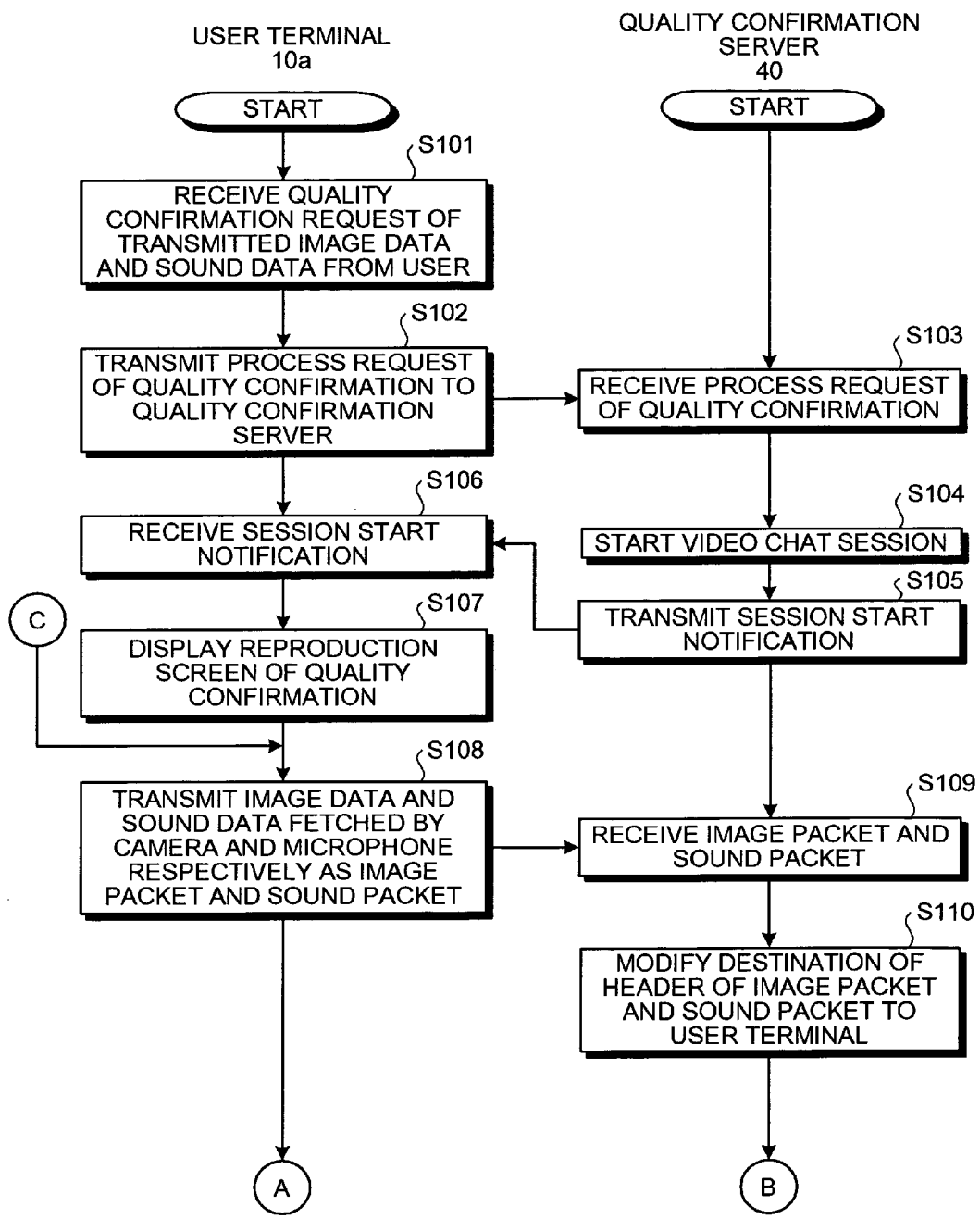
FIG. 3 is a flowchart of a sequence of a reproduction quality confirming process according to the first embodiment.
Figure 4:
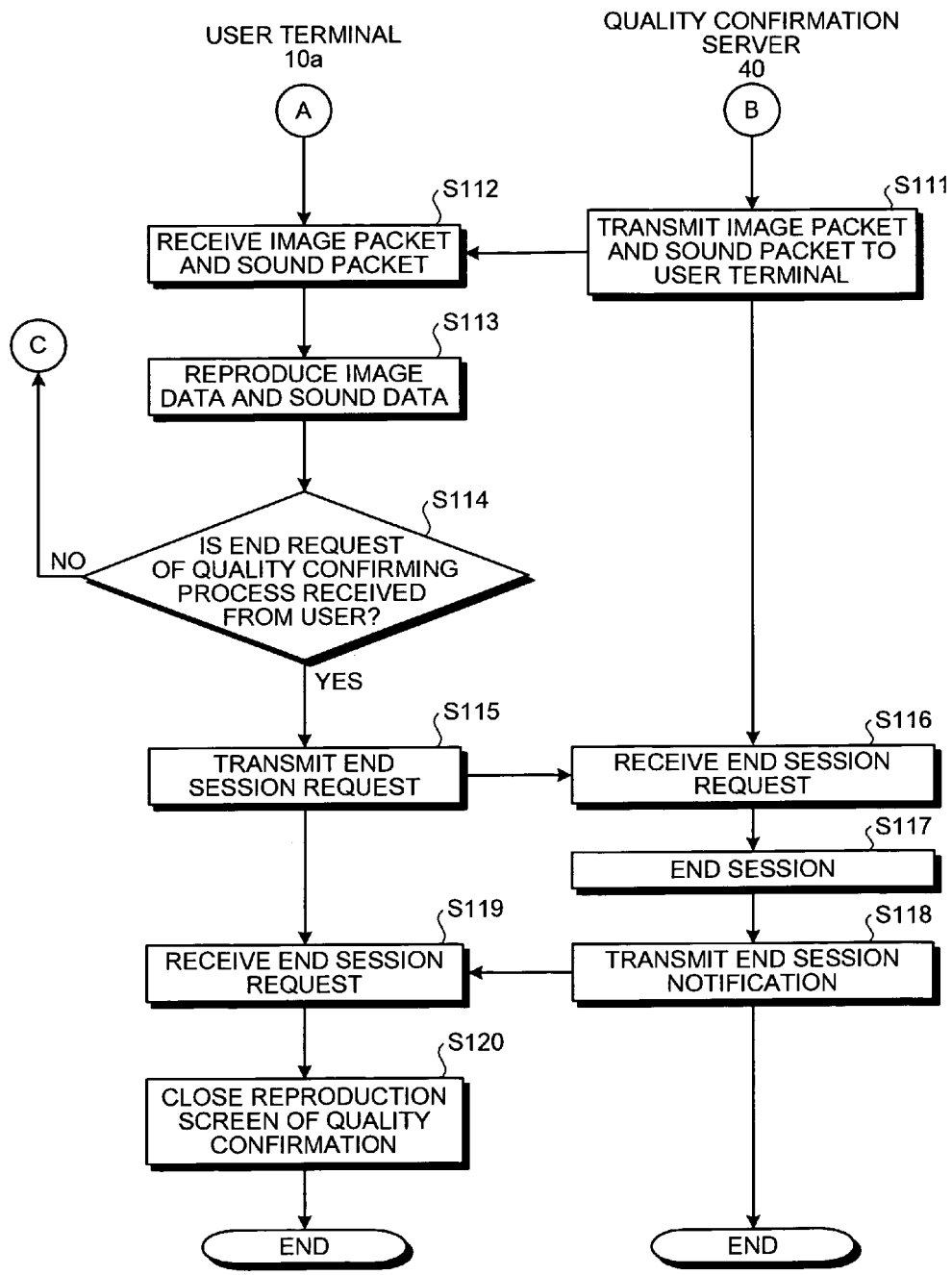
FIG. 4 is a continuation of the flowchart shown in FIG. 3.

A sequence of the reproduction quality confirming process according to the present embodiment is explained next. FIGS. 3 and 4 are flowcharts of the sequence of the reproduction quality confirming process according to the first embodiment.

As shown in FIG. 3, first, the quality-confirmation requesting unit 18 of the user terminal 10a receives an input of a confirm quality request of the transmitted image data and the sound data from the user (step S101). The quality-confirmation requesting unit 18 transmits a process request of quality confirmation to the quality confirmation server 40 (step S102).

Next, the data transceiver 41 of the quality confirmation server 40 receives the process request of quality confirmation that is transmitted by the user terminal 10a (step S103). The video chat processor 46 starts a video chat session (step S104), and transmits a session start notification to the user terminal 10a (step S105).

The data transceiver 16 of the user terminal 10a receives the session start notification that is transmitted by the quality confirmation server 40 (step S106). The video chat processor 17 displays a quality confirmation reproduction screen that reproduces the image data that is returned by the quality confirmation server 40 (step S107).

Next, the data transceiver 16 carries out a process to transmit the image data and the sound data that are fetched by the camera 30a and the microphone 20a respectively to the quality confirmation server 40 as an image packet and a sound packet respectively (step S108). Protocols related to streaming such as a Real-time Transport Protocol (RTP) and RTP Control Protocol (RTCP) etc. are used as protocols of the aforementioned transmission.

Next, the data transceiver 41 of the quality confirmation server 40 receives the image packet and the sound packet that are transmitted by the user terminal 10a (step S109). The video chat processor 46 modifies the destination of the received image packet and the sound packet to the user terminal 10a that has transmitted the image packet and the sound packet (step S110).

Next, as shown in FIG. 4, the data transceiver 41 of the quality confirmation server 40 carries out a process to transmit to the user terminal 10a the image packet and the sound packet having the modified destination (step S111). The same protocols related to streaming that are used at step S108 are used as protocols of the aforementioned transmission.

The data transceiver 16 of the user terminal 10a receives the image packet and the sound packet that are transmitted by the quality confirmation server 40 (step S112). The video chat processor 17 carries out a process to reproduce by streaming the received image data and the sound data along with the image data that is fetched by the camera 30a (step S113).

Next, the quality-confirmation requesting unit 18 checks whether the user terminal 10a has received an input of the end request of the reproduction quality confirming process from the user (step S114). If the user terminal 10a has not received the input of the end request of the reproduction quality confirming process (No at step S114), the reproduction quality confirming process moves to step S108 and the data transceiver 16 continues the process to transmit to the quality confirmation server 40 the image data and the sound data that are fetched by the camera 30a and the microphone 20a respectively.

If the user terminal has received the input of the end request of the reproduction quality confirming process (Yes at step S114), the quality-confirmation requesting unit 18 transmits an end request of the video chat session to the quality confirmation server 40 via the data transceiver 16 (step S115).

The data transceiver 41 of the quality confirmation server 40 receives the end request of the video chat session that is transmitted by the user terminal 10a (step S116) and the video chat processor 46 ends the video chat session (step S117). Next, the video chat processor 46 transmits to the user terminal 10a a session end notification via the data transceiver 41 (step S118) and ends the reproduction quality confirming process.

The data transceiver 16 of the user terminal 10a receives the session end notification that is transmitted by the quality confirmation server 40 (step S119). The video chat processor 17 closes the quality confirmation reproduction screen (step S120) and ends the reproduction quality confirming process.

Thus, in the first embodiment, the data transceiver 16 of the user terminal 10a receives from the destination the image data and the sound data that is transmitted by streaming, and the video chat processor 17 of the user terminal 10a reproduces the received data, thereby enabling the user to easily and efficiently confirm the reproduction quality of the data that is transmitted by streaming.

In the first embodiment, the destination modifies the destination address of data that is transmitted by streaming in packets that represent transmission units of data, and the data transceiver 18 of the user terminal 10a receives the data that is returned by the destination, thereby enabling the user to easily and efficiently confirm, based on the returned data, the reproduction quality of the data that is transmitted by streaming in real time.

Further, in the first embodiment, the video chat processor 17 of the user terminal 10a reproduces the data that is transmitted by streaming along with the received data, thereby enabling the user to easily and efficiently confirm, by comparing the reproduction quality of the two data, the reproduction quality of the data that is transmitted by streaming in real time.

In the first embodiment, the data transceiver 41 of the quality confirmation server 40 receives the data that is transmitted by streaming via the Internet 50, and the video chat processor 46 of the quality confirmation server 40 returns the received data to the source, thereby enabling the user to easily and efficiently confirm the reproduction quality of the data that is transmitted by streaming.

In the first embodiment, the video chat processor 46 of the quality confirmation server 40 modifies to the user terminal 10a the destination of each packet that is the transmission unit of data transmitted by streaming, and returns the data, thereby enabling the user to easily and efficiently confirm the reproduction quality of the data that is transmitted by streaming in real time.

Confirmation of the reproduction quality by the user using a server that returns the packets of the data that is transmitted by streaming is explained in the first embodiment. However, the data transmitted by streaming can be stored as a video file by the destination and returned, thereby enabling the user to confirm the reproduction quality. Storage as a video file by the destination of the data that is transmitted by streaming and returning of the stored data is explained in a second embodiment.

Figure 5:
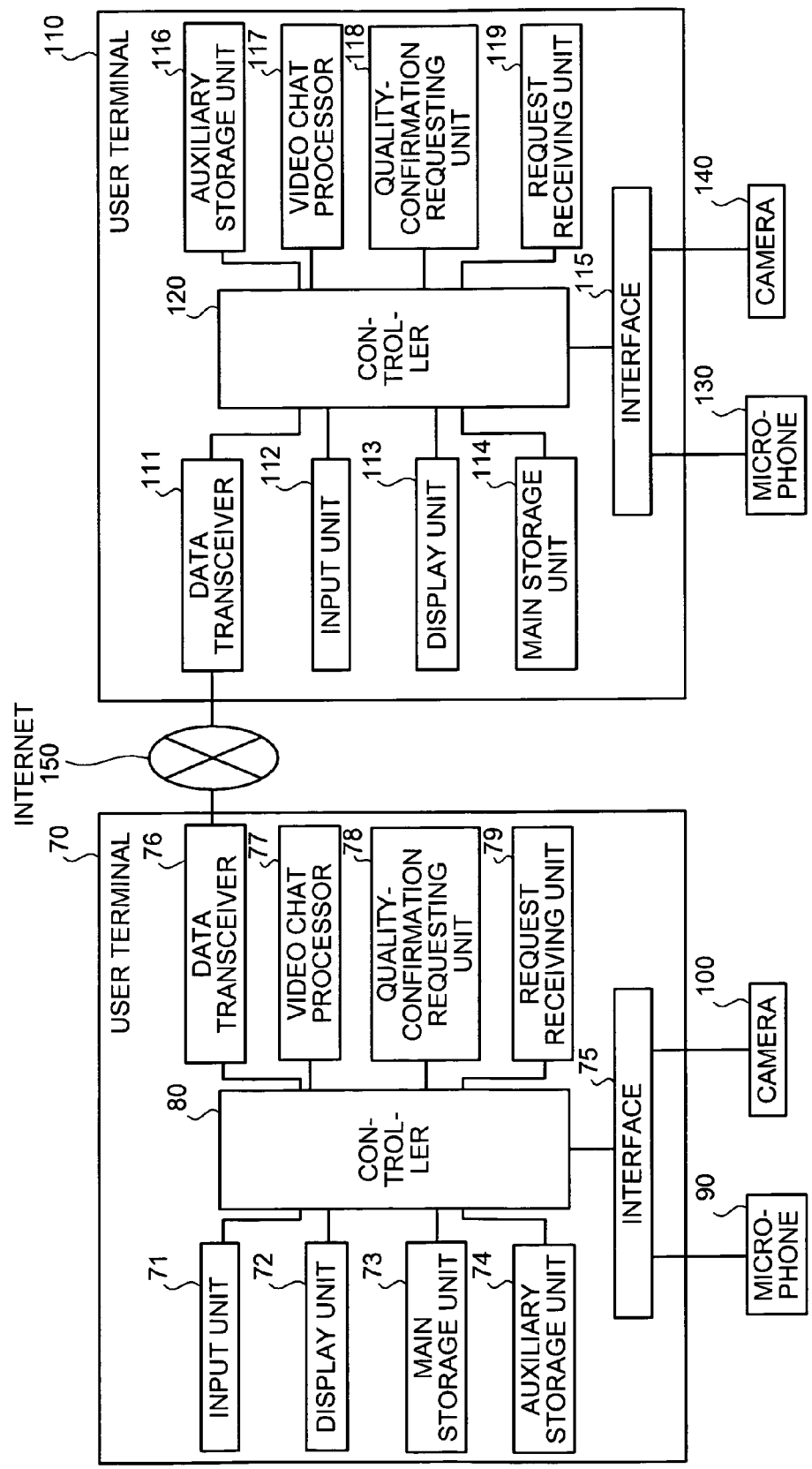
FIG. 5 is a functional block diagram of a streaming system according to a second embodiment of the present invention.

A functional structure of a streaming system according to the second embodiment is explained first. FIG. 5 is a functional block diagram of the streaming system according to the second embodiment.

As shown in FIG. 5, in the streaming system according to the second embodiment, a microphone 90 that fetches a sound and a camera 100 that shoots an image are connected to a user terminal 70. Similarly, a microphone 130 and a camera 140 are connected to a user terminal 110. The user terminal 70 and the user terminal 110 are connected via Internet 150.

The user terminal 70 transceives image data and sound data with the user terminal 110 by streaming. The user carries out video chat in real time using the user terminal 70.

Apart from transceiving data with the user terminal 110, the user terminal 70 receives from the user an execute request of the reproduction quality confirming process of the data that is transmitted by streaming. Upon receiving the execute request of the reproduction quality confirmation process, the user terminal 70 packet transmits data to the user terminal 110 by streaming.

Upon receiving the packets transmitted by the user terminal 70, the user terminal 110 stores the received image data and sound data as a video file, and returns the stored data to the user terminal 70.

The user terminal 70 receives the data that is returned by the user terminal 110 and reproduces the received data, thereby enabling the user to easily and efficiently confirm the reproduction quality of the data that is transmitted from the user terminal 70.

In the second embodiment, the user terminal 70 receives the execute request of the reproduction quality confirming process from the user, the user terminal 110 stores as a video file the data that is transmitted from the user terminal 70 by streaming, and returns the stored data to the user terminal 70. However, because the user terminal 70 and the user terminal 110 include equivalent functions, the roles of the user terminal 70 and the user terminal 110 can be switched.

As shown in FIG. 5, the user terminal 70 includes an input unit 71, a display unit 72, a main storage unit 73, an auxiliary storage unit 74, an interface 75, a data transceiver 76, a video chat processor 77, a quality-confirmation requesting unit 78, a request receiving unit 79, and a controller 80.

The user terminal 110 includes a data transceiver 111, an input unit 112, a display unit 113, a main storage unit 114, an interface 115, an auxiliary storage unit 116, a video chat processor 117, a quality-confirmation requesting unit 118, a request receiving unit 119, and a controller 120.

The input unit 71 and the input unit 112 are input devices such as a mouse or a keyboard. The display unit 72 and the display unit 113 are display devices such as a display. The main storage unit 73 and the main storage unit 114 are main memory devices such as a RAM, and carry out a process to temporarily store various types of data.

For example, the main storage unit 73 and the main storage unit 114 temporarily store the sound data that is fetched by the microphone 90 and the microphone 130 respectively, the image data that is shot by the camera 100 and the camera 140 respectively, the image data and the sound data that are received from the other user terminal 70 or the user terminal 110 etc.

The auxiliary storage unit 74 and the auxiliary storage unit 116 are auxiliary memory devices such as a Hard Disk, and store various types of data related to the operating system, application software etc. The data transceiver 76 and the data transceiver 111 carry out transceiving of data with the other user terminal 70 or the user terminal 110.

The video chat processor 77 reproduces the sound data that is fetched by the microphone 90 and the image data that is fetched by the camera 100 that are connected to the user terminal 70. The video chat processor 117 reproduces the sound data that is fetched by the microphone 130 and the image data that is fetched by the camera 140 that are connected to the user terminal 110. The video chat processor 77 and the video chat processor 117 carry out a process to reproduce by streaming the image data and the sound data received from the other user terminal 110 or the user terminal 70.

The quality-confirmation requesting unit 78 and the quality-confirmation requesting unit 118 receive from the user an input of the start request and the end request of the reproduction quality confirming process, and transmit to the other user terminal 70 or the user terminal 110 the start request and the end request of the reproduction quality confirming process.

Upon transmitting the start request and the end request of the reproduction quality confirming process, the quality-confirmation requesting unit 78 and the quality-confirmation requesting unit 118 store the transmitted image data and the sound data as a video file. When storing the video file, the quality-confirmation requesting unit 78 and the quality-confirmation requesting unit 118 also store storage start timing of the video file. The video file is used for comparing the reproduction quality with a video file received from the other user terminal 110 or the user terminal 70.

Upon receiving the start request of the reproduction quality confirming process from the other user terminal 110 or the user terminal 70, the request receiving unit 79 and the request receiving unit 119 store as a video file the image data and the sound data that is packet transmitted by streaming from the other user terminal 110 or the user terminal 70. When storing the video file, the request receiving unit 79 and the request receiving unit 119 also store storage start timing of the video file.

Upon receiving the end request of the reproduction quality confirming process from the other user terminal 110 or the user terminal 70, the request receiving unit 79 and the request receiving unit 119 carry out a process to transmit to the other user terminal 110 or the user terminal 70 the stored video file and data of the storage start timing of the video file.

The controller 80 and the controller 120 control the entire user terminal 70 and the entire user terminal 110 respectively, and control transfer of data between various functioning units of the user terminal 70 and the user terminal 110 respectively.

FIG. 6 is a schematic of an example of a video chat screen 170 when a reproduction quality confirmation request is issued. An image 162 that is shot by the camera 100 connected to the user terminal 70 and an image 163 that is transmitted by streaming from the other user terminal 110 are displayed adjacent to each other in a video chat screen 160.

A confirmation button 161 that is displayed in the video chat screen 160 requests start of the reproduction quality confirmation process of the image data and the sound data that are transmitted by streaming. Upon clicking the confirmation button 161 by a mouse etc. a request to start the reproduction quality confirming process is issued to the user terminal 110 that is a destination.

Upon receiving the start request of the reproduction quality confirming process, the user terminal 110 inquires the user of the user terminal 110 whether to respond to the start request. To be specific, the user terminal 110 displays an inquiry message 171 in the displayed video chat screen 170.

If the user has clicked a yes button 172 of the inquiry message 171, the user terminal 110 starts to execute the reproduction quality confirming process and carries out a process to store as a video file the image data and the sound data that is transmitted by streaming. If the user has clicked a no button 173, the user terminal 110 does not execute the reproduction quality confirming process.

Figure 7:
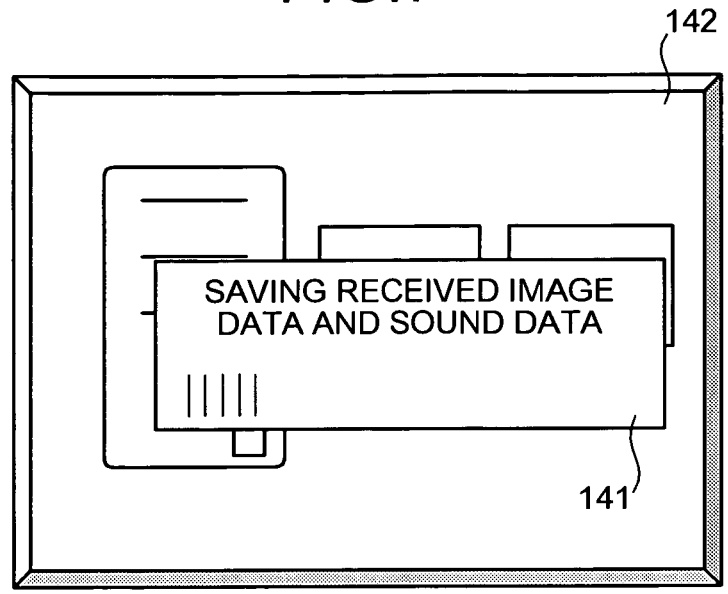
FIG. 7 is a schematic of an example of a message that is displayed during a storing process of received image data and sound data.

FIG. 7 is a schematic of an example of a message that is displayed during a storing process of the received image data and the sound data. When carrying out the storing process of the image data and the sound data that is transmitted by the user terminal 70, the user terminal 110 displays in a video chat screen 142 a message 141 that indicates that the storing process is in progress.

Figure 8:
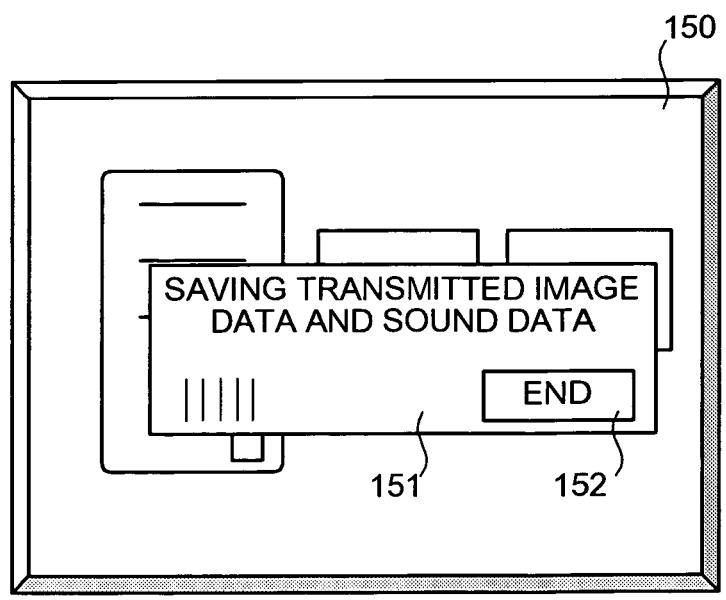
FIG. 8 is a schematic of an example of a message that is displayed during the storing process of transmitted image data and sound data.

FIG. 8 is a schematic of an example of a message that is displayed during the storing process of the transmitted image data and the sound data. When carrying out the storing process of the image data and the sound data that is transmitted to the user terminal 110, the user terminal 70 displays in a video chat screen 150 a message 151 that indicates that the storing process is in progress. An end button 152 that requests the user terminal 110 to end the storing process of the image data and the sound data is displayed in the message 151.

Upon clicking the end button 152 by a mouse etc. a request to end the reproduction quality confirming process is issued to the user terminal 110 that is the destination. The user terminal 110 carries out a process to transmit the stored video file to the user terminal 70.

In the second embodiment, the user terminal 70 receives the end request of the reproduction quality confirming process from the user. However, the user terminal 110 can also receive the end request of the reproduction quality confirming process from the user, transmit the stored video file to the user terminal 70, and end the reproduction quality confirming process.

Figure 9:
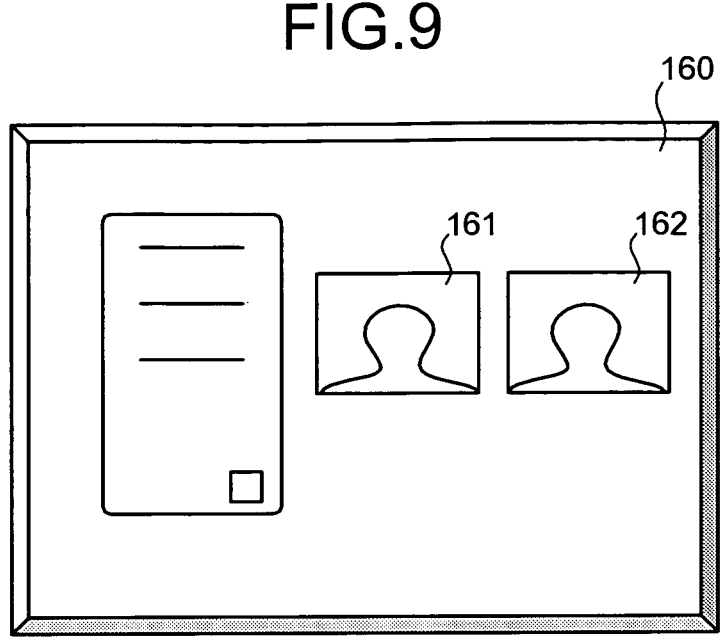
FIG. 9 is a schematic of an example of a video chat screen that carries out reproduction quality confirmation of the image data and the sound data.

FIG. 9 is a schematic of an example of the video chat screen 160 that carries out reproduction quality confirmation of the image data and the sound data. A reproduced image 161 of the video file that is shot by the camera 100 connected to the user terminal 70 and the reproduced image 162 of the video file that is transmitted by the user terminal 110 are displayed in the video chat screen 160. The sound data of the video file that is transmitted by the user terminal 110 is also reproduced together.

When reproducing the two video files, a difference between storage start timings is calculated from data of the storage start timings of the two video files, and the two video files are reproduced with a time delay that is equal to the calculated difference between the storage start timings, thereby enabling the user to compare the reproduced image 161 with the reproduced image 162 and to easily confirm a distortion of the image data and the sound data, time lag during reproduction etc.

Figure 10:
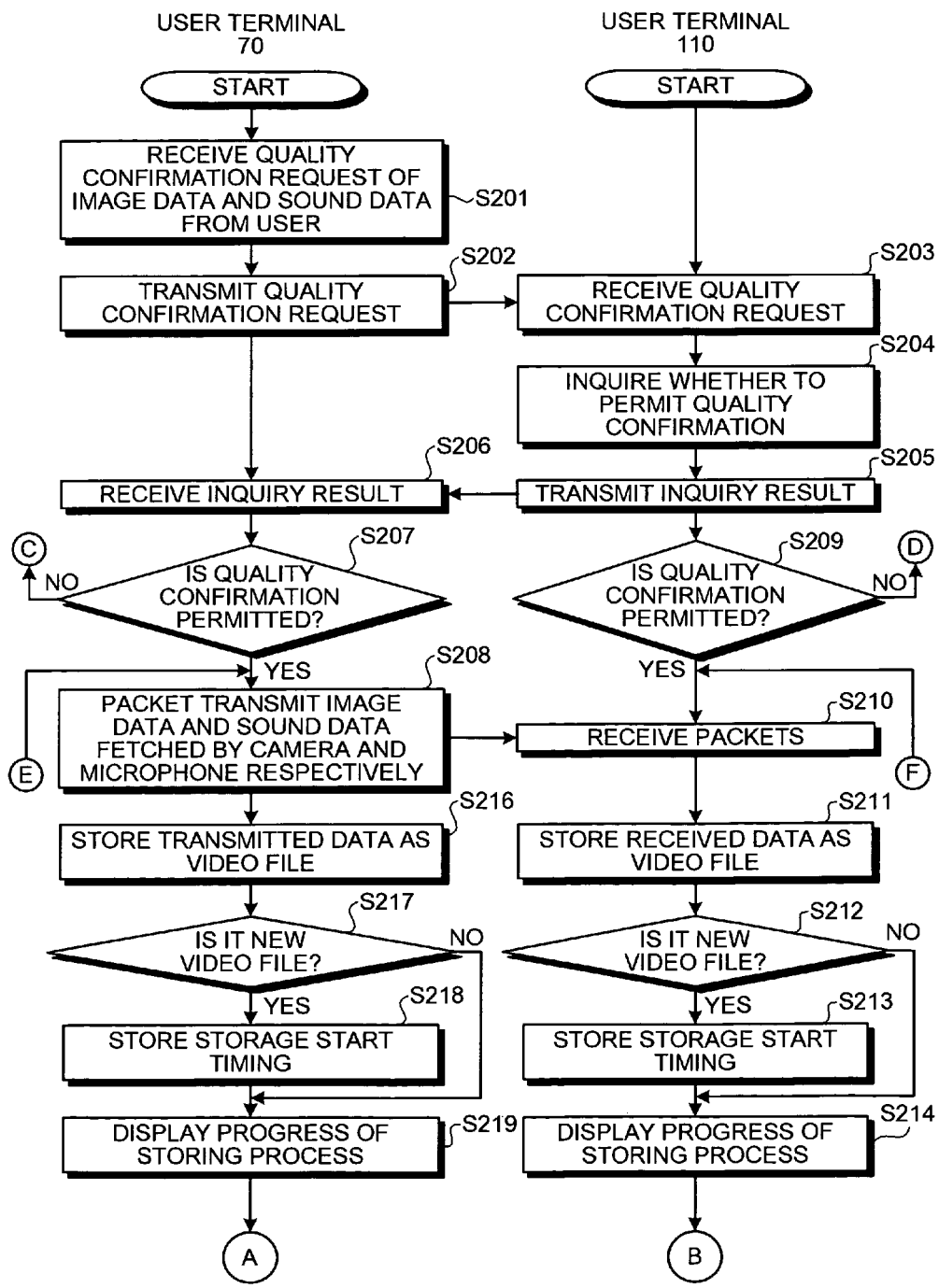
FIG. 10 is a flowchart of a sequence of a reproduction quality confirming process according to the second embodiment.
Figure 11:
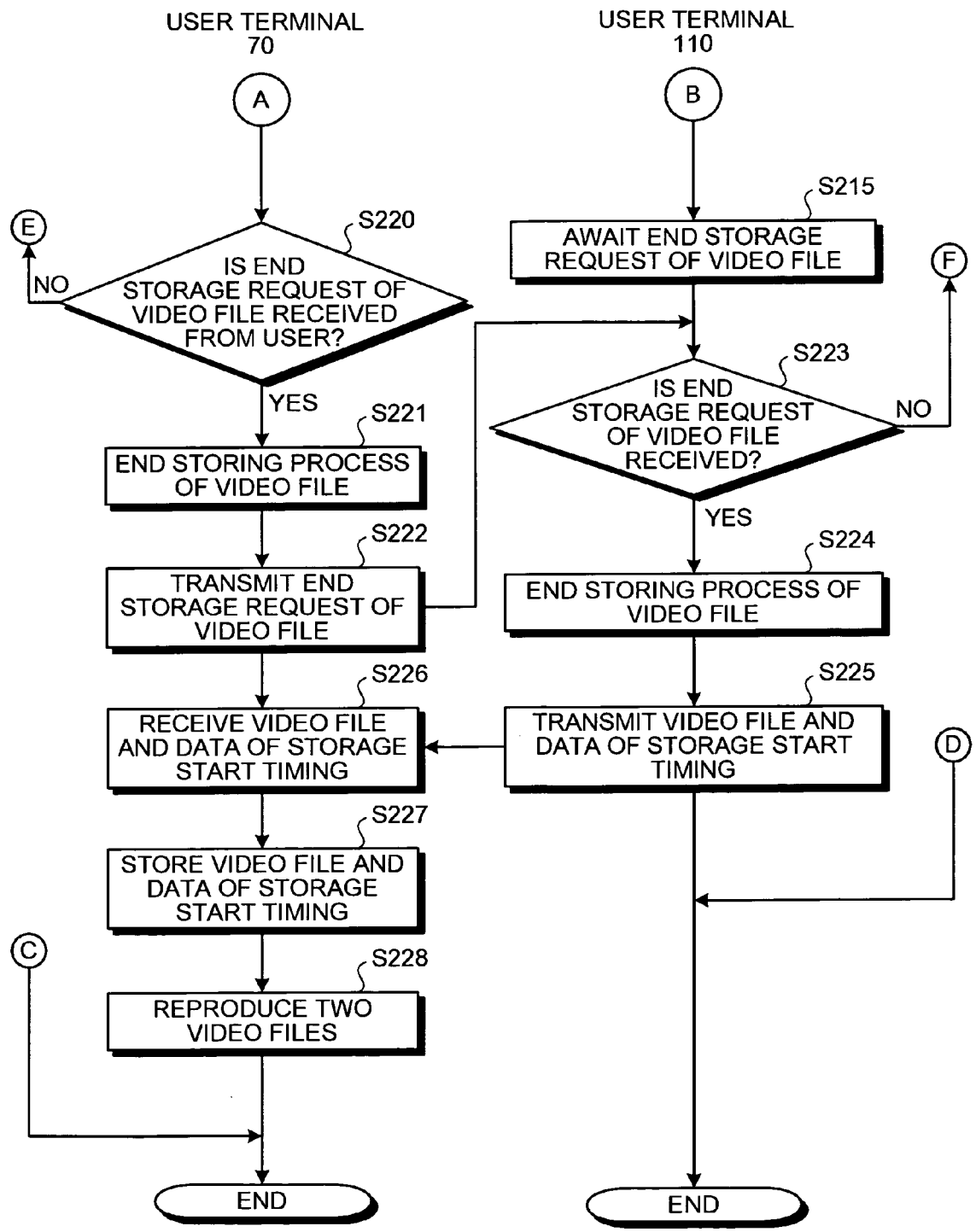
FIG. 11 is a continuation of the flowchart shown in FIG. 10.

A sequence of the reproduction quality confirming process according to the second embodiment is explained next. FIGS. 10 and 11 are flowcharts of the sequence of the reproduction quality confirming process according to the second embodiment.

As shown in FIG. 10, first, the quality-confirmation requesting unit 78 of the user terminal 70 receives from the user an input of the reproduction quality confirmation request of the image data and the sound data (step S201). Next, the quality-confirmation requesting unit 78 transmits the process request of reproduction quality confirmation to the user terminal 110 of the communication partner (step S202).

Next, the data transceiver 111 of the user terminal 110 receives the process request of reproduction quality confirmation that is transmitted by the user terminal 70 (step S203). Upon receiving the process request of reproduction quality confirmation, the request receiving unit 119 carries out a process to inquire to the user whether to execute the reproduction quality confirming process (step S204), and carries out a process to transmit an inquiry result to the user terminal 70 (step S205).

Next, the data transceiver 76 of the user terminal 70 receives data of the inquiry result that is transmitted by the user terminal 110 (step S206). The quality-confirmation requesting unit 78 checks whether the user has permitted the reproduction quality confirmation request (step S207).

If the user has not permitted the reproduction quality confirmation request (No at step S207), the reproduction quality confirming process ends. If the user has permitted the reproduction quality confirming process (Yes at step S207), the data transceiver 76 packet transmits to the user terminal 110 the image data and the sound data that are fetched by the camera 100 and the microphone 90 respectively that are connected to the user terminal 70 (step S208). Protocols related to streaming such as the RTP and the RTCP etc. are used as protocols in the aforementioned transmission.

After transmitting the data of the inquiry result to the user terminal 70 at step S205, the request receiving unit 119 of the user terminal 110 checks whether the user has permitted the reproduction quality confirmation request (step S209).

If the reproduction quality confirmation request is not permitted (No at step S209), the reproduction quality confirming process ends. If the reproduction quality confirmation request is permitted (Yes at step S209), the data transceiver 111 awaits and receives the packets of the image data and the sound data that are transmitted by the user terminal 70 (step S210).

Next, the request receiving unit 119 starts a process to store as a video file the image data and the sound data received from the user terminal 70 (step S211). The request receiving unit 119 checks whether the video file that is being subjected to the storing process is a new video file (step S212).

If the video file that is being subjected to the storing process is a new video files (Yes at step S212), the request receiving unit 119 stores the storage start timing of the video file (step S213). The request receiving unit 119 displays progress of the storing process in the display (step S214).

Next, as shown in FIG. 11, the request receiving unit 119 of the user terminal 110 awaits a transmission of the end request of the storing process of the video file from the user terminal 70 (step S215).

As shown in FIG. 10, after packet transmitting the image data and the sound data to the user terminal 110 at step S208, the quality-confirmation requesting unit 78 of the user terminal 70 starts a process to store the transmitted image data and the sound data as a video file (step S216). Next, the quality-confirmation requesting unit 78 checks whether the video file that is being subjected to the storing process is a new video file (step S217).

If the video file that is being subjected to the storing process is a new video file (Yes at step S217), the quality-confirmation requesting unit 78 stores the storage start timing of the video file (step S218). The quality-confirmation requesting unit 78 displays a progress of the storing process in the display (step S219).

Next, as shown in FIG. 11, the quality-confirmation requesting unit 78 checks whether an input of the end request of the storing process of the video file is received from the user (step S220). If the input of the end request of the storing process is not received (No at step S220), the reproduction quality confirming process moves to step S208 and the quality-confirmation requesting unit 78 continues the process to packet transmit the image data and the sound data to the user terminal 110.

If the input of the end request of the storing process is received (Yes at step S220), the quality-confirmation requesting unit 78 ends the storing process of the video file (step S221) and carries out a process to transmit to the user terminal 110 the end request of the storing process of the video file (step S222).

The request receiving unit 119 of the user terminal 110 checks whether the end request of the storing process of the video file is received (step S223). If the end request of the storing process is not received (No at step S223), the reproduction quality confirming process moves to step S210, and the data transceiver 111 continues the process to receive the packets of the image data and the sound data from the user terminal 70.

If the end request of the storing process is received (Yes at step S223), the request receiving unit 119 ends the storing process of the video file (step S224), transmits to the user terminal 70 via the data transceiver 111 the video file that is stored and data of the storage start timing of the video file (step S225), and ends the reproduction quality confirming process. Non streaming type protocols such as a File Transport Protocol (FTP) are used in transmission of the video file.

The data transceiver 76 of the user terminal 70 receives the video file and the data of the storage start timing of the video file that are transmitted by the user terminal 110 (step S226) and stores the received video file and the data of the storage start timing of the video file in the auxiliary storage unit 74 (step S227).

Next, the video chat processor 77 reproduces the video file that is stored by the user terminal 70 and the video file that is received from the user terminal 110 (step S228) and ends the reproduction quality confirming process.

To be specific, the video chat processor 77 calculates a difference between the storage start timings from the data of the storage start timing of the video file that is stored by the user terminal 70 and the data of the storage start timing of the video file that is received from the user terminal 110, and reproduces the two video files with a time delay that is equal to the calculated difference between the storage start timings.

Thus, in the second embodiment, the data transceiver 76 of the user terminal 70 receives the data transmitted by streaming from the user terminal 110, and the video chat processor 77 of the user terminal 70 reproduces the received data, thereby enabling the user to easily and efficiently confirm the reproduction quality of the data that is transmitted by streaming.

In the second embodiment, the data transceiver 76 of the user terminal 70 receives the data that is transmitted by streaming and stored as a video file by the user terminal 110, thereby enabling the user to accurately grasp the reproduction quality of the data transmitted by streaming.

In the second embodiment, upon transmission of data by the data transceiver 76 of the user terminal 70, the quality-confirmation requesting unit 78 of the user terminal 70 stores the transmitted data as a video file in the auxiliary storage unit 74. The data transceiver 76 of the user terminal 70 receives data that corresponds to the data stored in the auxiliary storage unit 74 and that is stored as a video file by the user terminal 110. The video chat processor 77 of the user terminal 70 reproduces the data stored in the auxiliary storage unit 74 along with the data received from the user terminal 110, thereby enabling the user to compare the reproduction quality of the two video files, thus enabling to accurately confirm the reproduction quality of the data transmitted by streaming.

In the second embodiment, the data transceiver 111 of the user terminal 110 receives the data transmitted by streaming and the request receiving unit 119 of the user terminal 110 returns the received data to the user terminal 70, thereby enabling the user to easily and efficiently confirm the reproduction quality of the data that is transmitted by streaming.

In the second embodiment, the request receiving unit 119 of the user terminal 110 stores the received data as a video file and returns the stored data, thereby enabling the user to accurately grasp the reproduction quality of data transmitted by streaming.

Realizing a reproduction quality confirming function of the image data and the sound data using a computer is explained in the first and the second embodiments. However, the reproduction quality confirming function can also be realized by recording a program for realizing the reproduction quality confirming function in a computer readable recording medium, and causing the computer to read and execute the program recorded in the recording medium.

Figure 12:
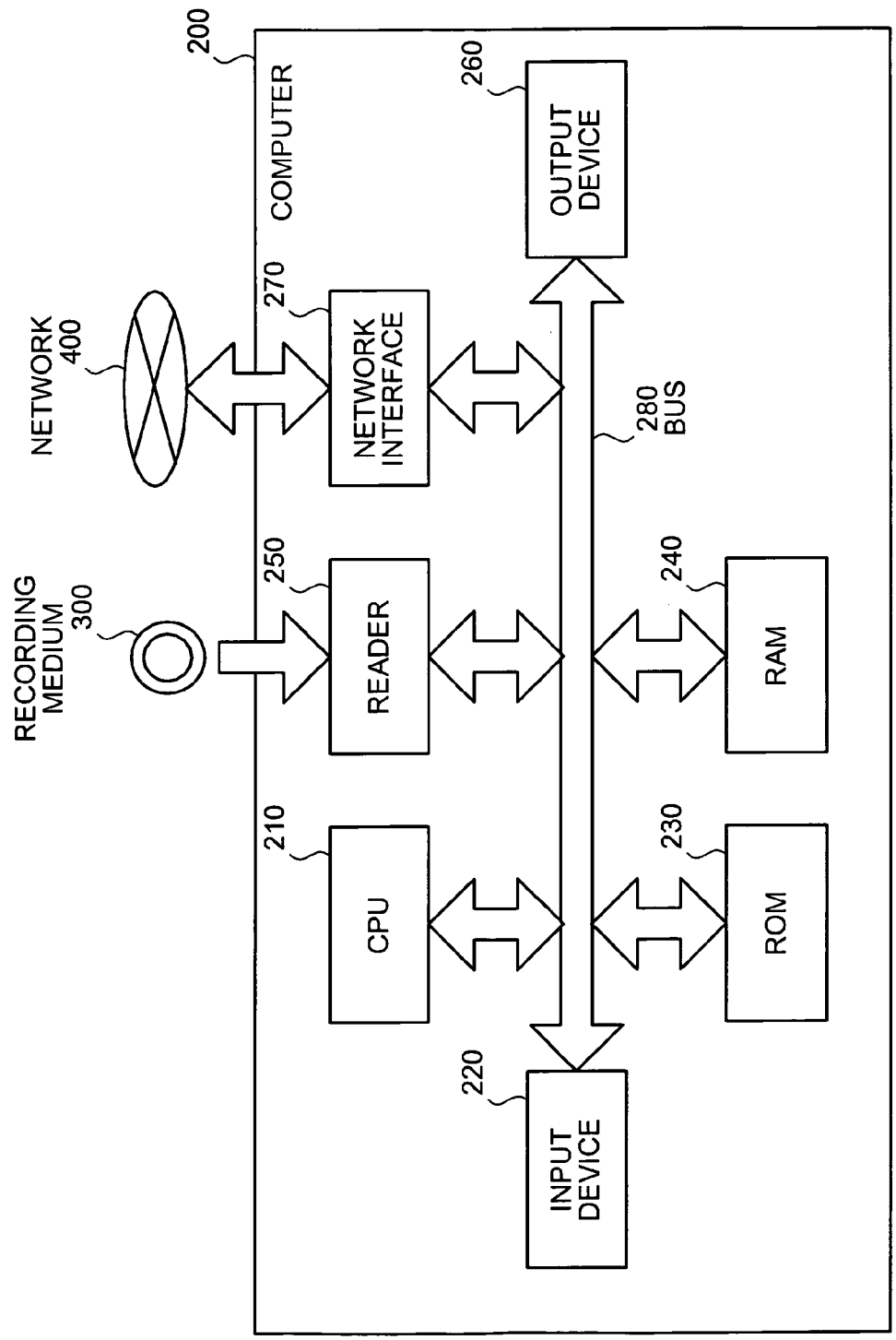
FIG. 12 is a block diagram of a hardware structure of a computer that realizes a reproduction quality confirming function of data.

FIG. 12 is a block diagram of a hardware structure of a computer 200 that realizes the reproduction quality confirming function of data. As shown in FIG. 12, the computer 200 includes a Central Processing Unit (CPU) 210 that executes the program, an input device 220 that inputs data, a Read Only Memory (ROM) 230 that stores various types of data, a RAM 240 that stores computation parameters etc., a reader 250 that reads the program from a recording medium 300 that records the program for realizing the reproduction quality confirming function, an output device 260 such as a display, and a network interface 270 that carries out transfer of data between the computer 200 and another computer via a network 400. A bus 280 connects the CPU 210, the input device 220, the ROM 230, the RAM 240, the reader 250, the output device 260, and the network interface 270.

The CPU 210 reads the program recorded in the recording medium 300 via the reader 250 and executes the read program, thereby realizing the reproduction quality confirming function. An optical disk, a Flexible Disk, a Compact Disk-Read Only Memory (CD-ROM), Hard Disk etc. can be used as the recording medium 300. The program can also be installed in the computer 200 via the network 400.

Although the invention has been described with respect to specific embodiments for a complete and clear disclosure, various modifications may be made without departing from the spirit or scope of the general inventive concept as defined by the appended claims and their equivalents.

For example, although execution of the reproduction quality confirming process of both the image data and the sound data is explained in the first and the second embodiments, the present invention is not to be thus limited and the reproduction quality confirmation process can be carried out only for any one of the image data and the sound data.

In the first and the second embodiments, the reproduction quality of the sound data is confirmed by reproducing the sound data that is returned from the computer of the communication partner. However, the present invention is not to be thus limited, and the user can also confirm the reproduction quality by converting into sound waveforms the sound data transmitted to the communication partner and the sound data returned from the computer of the communication partner and visually reproducing the sound waveforms.

A server that is included in the ASP and that returns the data received by streaming from the user terminal is explained in the first embodiment. However, the present invention is not to be thus limited, and the other user terminals can also return the data received by streaming from the user terminals.

In the second embodiment, the user terminal stores the data received by streaming as a video file and returns the stored data to the user terminal that is a source. However, the present invention is not to be thus limited, and the server that is included in the ASP can also store the received data as a video file and return the stored data.

All the automatic processes explained in the present embodiments can be, entirely or in part, carried out manually. Similarly, all the manual processes explained in the present embodiments can be entirely or in part carried out automatically by a known method.

The sequence of processes, the sequence of controls, specific names, and data including various parameters can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions performed by the apparatus are entirely or partially realized by the CPU or a program executed by the CPU or by a hardware using wired logic.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of confirming data comprising:
    receiving a confirmation request at a first terminal and transmitting the confirmation request to a second terminal;
    transmitting first data from the first terminal to the second terminal by streaming;
    storing at the second terminal the received first data and recording a time of start of the storing of the received first data;
    storing at the first terminal the transmitted first data and recording a time of start of the storing of the transmitted first data:
    upon receiving an end request, ending at the first terminal the storing of the transmitted first data and transmitting the end request to the second terminal;
    upon receiving the transmitted end request, at the second terminal
        stopping storing of the received first data, and
        transmitting to the first terminal the stored received first data as returned data and the time of start of the storing of the received first data;
    receiving and storing at the first terminal the returned data and the time of the start of the storing of the received first data that are transmitted by the second terminal;
    calculating at the first terminal a difference between the time of start of the storing of the received first data that was transmitted by the second terminal and the time of the start of the storing of the transmitted first data recorded by the first terminal; and
    reproducing data based on the calculation.

2. The method according to claim 1, wherein the reproducing data is based on a time delay that is equal to a calculated difference between the time of start of the storing of the received first data that was transmitted by the second terminal and the time of the start of the storing of the transmitted first data recorded by the first terminal.

3. The method according to claim 1, wherein the reproducing data is reproducing a first file originating at the first terminal and transmitted to the second terminal and reproducing a second file originating at the second terminal and transmitted to the first terminal.

* * * * *